Oct. 10, 1967  M. B. HEIZER, JR  3,346,084
TORQUE TRANSMITTER WITH OVERLOAD RELEASE
Filed Aug. 18, 1965  2 Sheets-Sheet 1
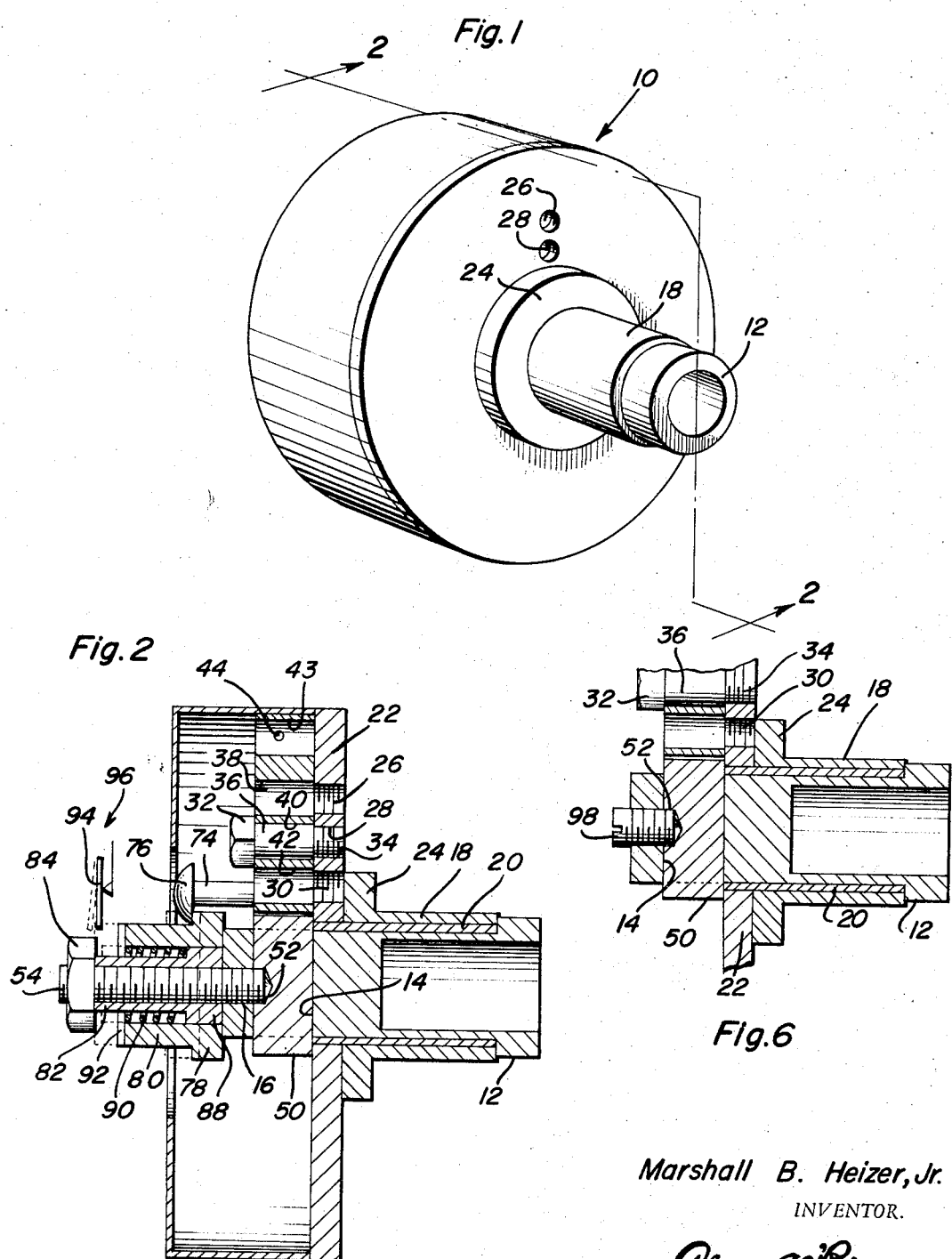
Marshall B. Heizer, Jr.
INVENTOR.

Oct. 10, 1967   M. B. HEIZER, JR   3,346,084
TORQUE TRANSMITTER WITH OVERLOAD RELEASE
Filed Aug. 18, 1965   2 Sheets-Sheet 2

Marshall B. Heizer, Jr.
INVENTOR.

BY Clarence A. O'Brien
and Harvey B. Jacobson
Attorneys

_United States Patent Office_

3,346,084
Patented Oct. 10, 1967

3,346,084
TORQUE TRANSMITTER WITH OVERLOAD RELEASE
Marshall B. Heizer, Jr., Rte. 1, Box 12,
Rawlings, Va. 23876
Filed Aug. 18, 1965, Ser. No. 480,602
9 Claims. (Cl. 192—150)

ABSTRACT OF THE DISCLOSURE

First and second relatively rotatable driving and driven members, respectively, provided with readily reversible torque transmitting means operatively connected therebetween and including overload release means whereby the overload release means may be rendered operative in each direction of rotation of the driving member in order to couple the driving member to the driven member.

---

This invention relates to a novel and useful torque transmitter with overload release and more specifically to a drive coupling member adapted to be utilized to drivingly connect one rotatable member to a second member rotatable relative thereto.

The torque transmitter of the instant invention includes means defining an input shaft portion and an output portion rotatable relative thereto with means for drivingly connecting the input portion to the output portion including overload release means. By utilizing the torque transmitter of the instant invention maximum driving torque transmitted from one member to another may be preset so as not to cause overloading of the driven member.

The main object of this invention is to provide a torque transmitter for transmitting torque from one rotatable member to another and including overload release means whereby only a maximum amount of torque may be transmitted from the first member to the second member.

Still another object of this invention is to provide a torque transmitter in accordance with the preceding object and including means whereby the overload release portion thereof may be adjusted so as to be capable of transmitting torque in opposite directions of rotation while still maintaining the overload release feature thereof.

Yet another object of this invention is to provide an apparatus in accordance with the preceding objects and including means whereby the amount of maximum torque capable of being transmitted may be readily adjusted.

Yet another object of this invention is to provide a torque transmitter in accordance with the preceding objects and including switch means which may be operatively connected to the input power source for the torque transmitter in a manner controlling operation thereof and which will be operable, in response to torque transmitter sensing an overload of input torque, to terminate operation of the torque input producing means.

A final object of this invention to be specifically enumerated herein is to provide an apparatus in accordance with the preceding objects and which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the torque transmitter;

FIGURE 2 is a vertical sectional view of the torque transmitter taken substantially upon the plane indicated by the section line 2—2 of FIGURE 1;

Figure 5:
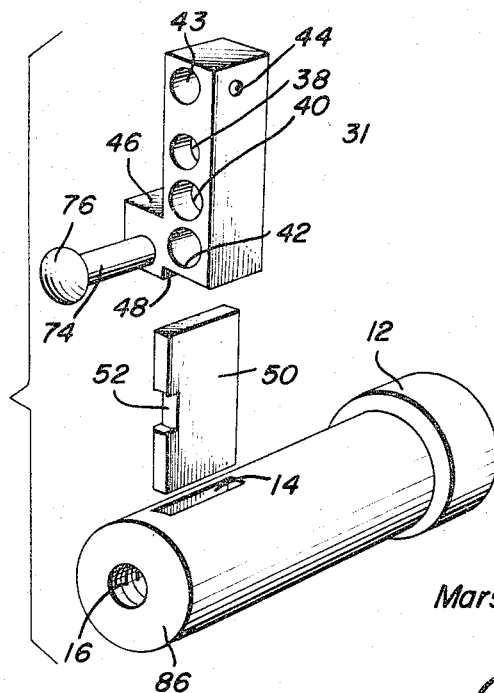

FIGURE 5 is an exploded perspective view of the torquet-transmitting components of the instant invention; and FIGURE 6 is a fragmentary vertical sectional view similar to that of FIGURE 2 but showing a modified form of torque transmitter without the control switch means included in the embodiment illustrated in FIGURE 2 of the drawings for controlling operation of the source of input torque drivingly connected to the torque transmitter.

Referring now more specifically to the drawings, the numeral 10 generally designates the torque transmitter of the instant invention which includes a torque input shaft portion 12 having a diametric slot 14 formed through one end portion with which an axial threaded bore 16 is communicated. The shaft portion 12 has a hub 18 journalled thereon by means of a sleeve bushing 20 disposed between the shaft portion 12 and the hub 18 and a generally circular plate 22 is secured to the mounting flange 24 of the hub 18 in any convenient manner.

The plate 22 or the hub 18 may be utilized as torque output members if the shaft portion 12 is utilized as a torque input member. However, the shaft portion 12 may be utilized as a torque output member if either the hub 18 or the plate 22 is utilized as a torque input member.

The plate 22 has three radially spaced threaded bores 26, 28 and 30 formed therethrough and a torque-transmitting lever generally referred to by the reference numeral 31 is pivotally supported from the plate 22 by means of a headed pivot pin 32 including a diametrically reduced threaded end portion 34 which is selectively threadedly engageable in one of the bores 26, 28 and 30. The pin 32 includes a large diameter smooth shank portion 36 which is rotatably received through one of three smooth bores 38, 40 and 42 spaced longitudinally of the lever 31 and corresponding to the bores 26, 28 and 30.

One end of the lever 31 includes a fourth smooth bore 43 formed therethrough and with which a pair of opposite side lateral small diameter bores 44 are communicated. The end of the lever 31 remote from the bore 43 includes a laterally offset end portion 46 defining a shoulder 48 with which a cam leaf 50 secured in and projecting outwardly of the opposite ends of the slot 14 is engageable. The cam leaf 50 is notched as at 52 and is retained in position within the slot 14 by means of an anchor screw 54 threadedly engaged in the bore 16 and seated in the notch 52.

Figure 3:
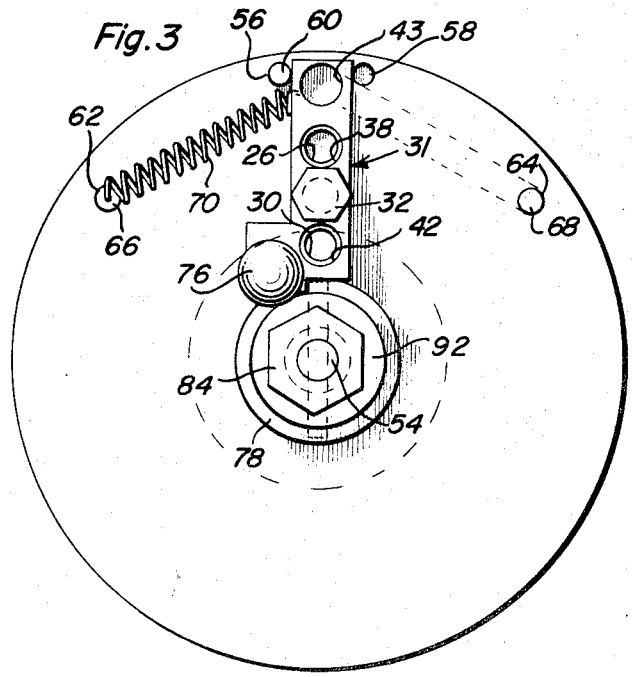
FIGURE 3 is a fragmentary side elevational view of the torque transmitter with portions thereof diagrammatically illustrated and removed to more clearly illustrate the structural details of the transmitter and with the components of the transmitter in torque-transmitting positions relative to each other.

The plate 22 is further provided with a pair of bores 56 and 58 which are disposed on opposite sides of the outer end of the lever 31 when the latter is positioned as illustrated in FIGURE 3 of the drawings and which selectively removably receive a stop pin 60 for engagement by the radial outermost end of the lever 31. Still further, an additional pair of circumferentially spaced bores 62 and 64 are formed in the plate 22 and have anchor pins 66 and 68 engaged therein. An expansion spring 70 may have one end secured to one of the anchor pins 66 and 68 and the other end removably engaged in the corresponding lateral bore 44. In this manner, it may be seen that the expansion spring 70 will yieldingly urge the radial outermost end of the lever 31 against the stop pin 60.

A retaining pin 74 is carried by the laterally projecting portion 46 of the lever 31 and includes a diametrically enlarged head 76 which is engageable with a radially outwardly projecting flange 78 carried by a sleeve 80 slidably disposed on the outer end of the anchor pin or screw 54. An inner sleeve 82 is disposed between the nut 84 threadedly engaged with the anchor screw 54 and the confronting end face 86 of the shaft portion 12. The inner sleeve 82 includes a shoulder 88 against which one end of a compression spring 90 abuts and the opposite end of the compression spring 90 is engaged with an annular washer 92 carried by the end of the sleeve 80 adjacent the nut 84. Therefore, the compression spring 90 yieldingly urges the sleeve 80 to an outermost position such as that illustrated in phantom lines in FIGURE 2 of the drawings for engagement with the spring arm 94 of an electric switch assembly generally referred to by the reference numeral 96. It is to be noted that the electric switch assembly 96 may be serially disposed in the operating circuit of an electric motor or in the ignition system of an ignition-actuated torque-delivering assembly such as an internal combustion engine drivingly connected to either the hub 18 or the shaft portion 12. Therefore, should the sleeve 80 be released for outward movement caused by the compression spring 90, the ignition system of an internal combustion engine drivingly coupled to either the shaft portion 12 or the hub 18 would be rendered inoperative until the sleeve 80 is reset to its innermost position illustrated in phantom lines in FIGURE 2 of the drawings.

In operation, the pivot fastener 32 is secured through one of the bores 38, 40 and 42 and in the corresponding bore of the bores 26, 28 and 30 formed in the plate 22. Then, the expansion spring 70 is secured to the radial outermost end of the lever 31 in a manner rendering the torque transmitter 10 operative to transmit torque in the desired direction of rotation of the transmitter 10. Of course, the stop or limit pin 60 is suitably secured in the correct bore of the bores 56 and 58.

Assuming that the sleeve 80 is in its innermost position as illustrated in FIGURE 2 of the drawings and the shaft portion 12 is being utilized as the torque input member and being rotated in a counterclockwise direction as viewed in FIGURE 3 of the drawings, the extended end portions of the cam leaf 50 will engage the shoulder 48 of the lever 31 and transmit torque from the shaft portion 12 to the plate 22 and thus the hub 18. However, should the predetermined amount of torque to be transmitted by means of the transmitter 10 be exceeded, the lever 31 will pivot in a clockwise direction against the tension of the expansion spring 70 to the position illustrated in FIGURE 4 of the drawings whereupon the extended end portion of the leaf 50 will pass the shoulder 48. At the same time the lever 31 is pivoted to the position illustrated in FIGURE 4 of the drawings, the head 76 of the anchor pin 74 is swung radially outwardly of the flange or flange portion 78 carried by the sleeve 80 and thus the sleeve 80 is released for outward movement to engage the spring contact arm 94 of the electrical switch assembly 96 thus terminating operation of the ignition system of an internal combustion engine whose output shaft is drivingly coupled to the shaft portion 12. Of course, in order to reset the transmitter 10, the lever 31 being held in the position of inoperativeness illustrated in FIGURE 4 of the drawings by contact of the head 76 with the flange 78, the sleeve 80 is first pushed to its innermost position illustrated in FIGURE 2 of the drawings thereby enabling the lever 31 to again be pivoted to the position illustrated in FIGURE 3 of the drawings whereupon the torque transmitter 10 will again be rendered operative and the ignition system of the internal combustion engine will also be able to function.

Figure 4:
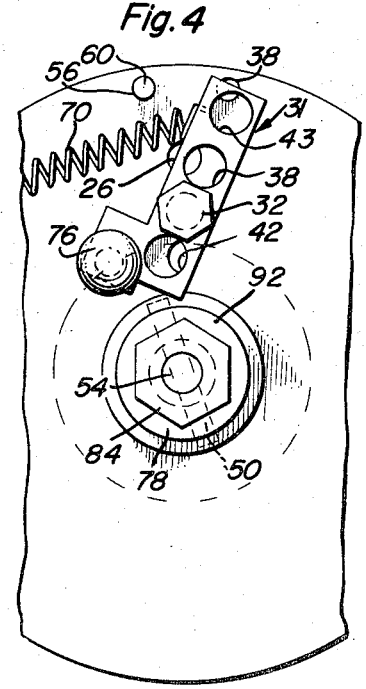
FIGURE 4 is a view similar to FIGURE 3 but showing the torque-transmitting components of the transmitter in the overload release position.

With attention now invited more specifically to FIGURES 3 and 4 of the drawings it will be seen that the shoulder 48 is offset to one side of the radius of axis of rotation of the shaft portion 12 along which the leaf 50 extends an amount equal to one-half the thickness of the leaf 50. Accordingly, it may be readily seen that the lever 31 may be removed and reversed front to rear from the position illustrated in FIGURE 3 of the drawings so as to adapt the torque transmitter 10 to transmit torque from the shaft portion 12 to the hub 18 during rotation of the shaft portion 12 in a clockwise direction as viewed in FIGURE 3 of the drawings. However, with the lever 31 in this position, the stop pin 60 is removed from the bore 56 and removably secured in the bore 58 and the expansion spring 70 is also removed and engaged with the opposite side of the lever 31 and the anchor pin 68. Still further, the pivot pin or fastener 32 may be secured in either pair of corresponding bores formed in the lever 31 and the plate 22 or the expansion spring 70 may be replaced by a stronger or weaker spring so as to adjust the maximum torque which may be transmitted by the torque transmitter 10 before the lever 31 pivots toward the inoperative position illustrated in FIGURE 4 of the drawings.

With attention now directed more specifically to FIGURE 6 of the drawings, in the event there is no need for the torque transmitter 10 to operate an electrical switch, the sleeves 80 and 82 may be omitted together with the retaining pin 74 and the anchor screw 54 may be replaced by means of a simple setscrew 98.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A torque transmitter with overload release means, said transmitter comprising first and second relatively rotatable members, cam means carried by a first of said members, torque transmitting means movably mounted on the second of said members on an axis generally paralleling the axis of rotation of said members shifting between active and inactive positions and disposed for engagement by said cam means when in said operative position thereof and out of the path of movement of said cam means when in said inactive position, respectively during rotation of said members relative to each other, stop means operatively associated with said torque transmitting means and said second member and limiting shifting movement of said torque transmitting means toward said inactive position, and means connected between said torque transmitting means and said second member yieldingly urging said torque transmitting means toward said active position, said second member and said torque transmitting means including means reversibly mounting said torque transmitting means from said second member and said stop means and said means yieldingly urging said torque transmitting means being reversibly supported from said second member whereby said overload release may be rendered operative in each direction of rotation of said first member relative to said second member.

2. A torque transmitter with overload release means, said transmitter comprising first and second relatively rotatable members, cam means carried by a first of said members, lever means pivotally secured to the second of said members for rotation about an axis stationarily positioned relative to said lever means and said second member and generally paralleling the axis of rotation of said members relative to each other and including a portion disposed for engagement by said cam means in a first pivoted position thereof and swingable in one direction to a second position out of the path of movement of said cam means during rotation of said members relative to each other, stop means operatively associated with said lever means and said second member and limiting swinging movement of said lever means in the opposite direction to said first position, and means connected between said lever means and said second member yieldingly urging said lever means toward said first position, said torque transmitter including means operative to adjustably position the axis of rotation of said lever means relative to said second member and along said lever means so as to vary the spacing between said axis and the portion of said lever means engageable with said cam means.

3. A torque transmitter with overload release means, said transmitter comprising first and second relatively rotatable members, cam means carried by a first of said members, lever means pivotally secured to the second of said members for rotation about an axis generally paralleling the axis of rotation of said members relative to each other and including a portion disposed for engagement by said cam means in a first pivoted position thereof and swingable in one direction to a second position out of the path of movement of said cam means during rotation of said members relative to each other, stop means operatively associated with said lever means and said second member and limiting swinging movement of said lever means in the opposite direction to said first position, and means connected between said lever means and said second member yieldingly urging said lever means toward said first position, said second member and said lever means including means reversibly pivotally supporting said lever means from said second member, and said stop means and said means yieldingly urging said lever are reversibly supported from said second member whereby said overload release may be rendered operative in each direction of rotation of said first member relative to said second member.

4. The combination of claim 3 wherein said torque transmitter includes means operative to adjustably position the axis of rotation of said lever means relative to said second member so as to vary the spacing between said axis and the portion of said lever means engageable with said cam means.

5. The combination of claim 1 including switch actuating means carried by one of said members and mounted for movement relative thereto between operative and inoperative positions, means yieldingly urging said switch actuating means toward said operative position, said torque transmitting means including means operative and inoperative to retain said switch actuating means in said inoperative position thereof when said torque transmitting means is in said active and inactive positions thereof, respectively.

6. The combination of claim 1 wherein said cam means projects generally radially of the axis of relative rotation of said first and second members and said torque transmitting means comprises an elongated lever pivotally secured to the second of said members and extending generally radially of the last-mentioned axis with said portion thereof engageable with said cam means disposed on the radially innermost end portion of said lever.

7. A torque transmitter with overload release means, said transmitter comprising first and second relatively rotatable members, cam means carried by a first of said members, lever means pivotally secured to the second of said members for rotation about an axis generally paralleling the axis of rotation of said members relative to each other and including a portion disposed for engagement by said cam means in a first pivoted position thereof and swingable in one direction to a second position out of the path of movement of said cam means during rotation of said members relative to each other, stop means operatively associated with said lever means and said second member and limiting swinging movement of said lever means in the opposite direction to said first position, and means connected between said lever means and said second member yieldingly urging said lever means toward said first position, said cam means projecting generally radially of the axis of relative rotation of said first and second members and said lever means comprising an elongated lever extending generally radially of the last-mentioned axis with said portion thereof engageable with said cam means disposed on the radially innermost end portion of said lever, said means yieldingly urging said lever toward said first position being inter-connected between the radially outermost end portion of said lever and said second member, the axis of rotation of said lever relative to said second member is disposed intermediate said radial innermost and outermost end portions of said lever.

8. A torque transmitter with overload release means, said transmitter comprising first and second relatively rotatable members, cam means carried by a first of said members, lever means pivotally secured to the second of said members and including a portion disposed for engagement by said cam means in a first pivoted position thereof and swingable in one direction to a second position out of the path of movement of said cam means during rotation of said members relative to each other, stop means operatively associated with said lever means and said second member and limiting swinging movement of said lever means in the opposite direction to said first position, and means connected between said lever and said second member yieldingly urging said lever means toward said first position, said torque transmitter including means operative to adjustably position the axis of rotation of said lever means relative to said second member and along said lever means so as to vary the spacing between said axis and the portion of said lever means engageable with said cam means.

9. The combination of claim 8 including switch actuating means carried by one of said members and mounted for movement relative thereto between operative and inoperative positions, means yieldingly urging said switch actuating means toward said operative position, said lever means including means operative and inoperative to retain said switch actuating means in said inoperative position thereof when said lever means is in said first and second positions thereof, respectively.

References Cited

UNITED STATES PATENTS

| 1,858,074 | 5/1932 | Damerell | 192—56 |
| 2,256,781 | 9/1941 | Nelson | 192—150 |
| 2,406,142 | 8/1946 | Gebert | 192—56 |
| 2,753,029 | 7/1956 | Babaian | 192—56 |

FOREIGN PATENTS 873,024  4/1953  Germany.

BENJAMIN W. WYCHE III, *Primary Examiner.*